United States Patent
Wai Kong (10) Patent No.: US 12,446,716 B2
(45) Date of Patent: Oct. 21, 2025

(54) EDIBLE CAKE STAND KIT

(71) Applicant: Chan Wai Kong, Edinburgh (GB)

(72) Inventor: Chan Wai Kong, Edinburgh (GB)

( * ) Notice: Subject to any disclaimer, the term of this patent is extended or adjusted under 35 U.S.C. 154(b) by 494 days.

(21) Appl. No.: 18/012,756

(22) PCT Filed: Jun. 28, 2021

(86) PCT No.: PCT/GB2021/051631
§ 371 (c)(1),
(2) Date: Dec. 23, 2022

(87) PCT Pub. No.: WO2022/003329
PCT Pub. Date: Jan. 6, 2022

(65) Prior Publication Data
US 2023/0200573 A1   Jun. 29, 2023

(30) Foreign Application Priority Data
Jun. 29, 2020   (GB) ..................................... 2009925

(51) Int. Cl.
*A47G 19/00* (2006.01)
*A23G 1/50* (2006.01)
*A47F 7/00* (2006.01)
*B65D 85/36* (2006.01)

(52) U.S. Cl.
CPC ............... *A47G 19/00* (2013.01); *A23G 1/50* (2013.01); *A47F 7/0071* (2013.01); *B65D 85/36* (2013.01); *A47G 2400/105* (2013.01)

(58) Field of Classification Search
None
See application file for complete search history.

(56) References Cited

U.S. PATENT DOCUMENTS

| 3,951,079 A | 4/1976 | Tolleson |
| 2012/0031860 A1 | 2/2012 | Goode et al. |

FOREIGN PATENT DOCUMENTS

RU   74275 U1   7/2008

OTHER PUBLICATIONS

Int'l Search Report for PCT/GB2021/051631, dated Sep. 24, 2021.

*Primary Examiner* — Jyoti Chawla
(74) *Attorney, Agent, or Firm* — MaxGoLaw PLLC (57) ABSTRACT

A kit of edible cake stand pieces having a base, at least two cake display platforms and a stem for supporting the cake display platforms provide a cost-efficient, transportable, robust, simple to assemble, and hygienic assembled tiered cake stand. The kit is formed of a stem with a base end and opposing upper end; a first support member for supporting a first display platform; and a second support member for supporting a second display platform which second support member is disposed further from the base end than the first support member, wherein the first support member has a larger radial extent than the second support member and where the first display platform has an aperture for receiving the stem and for passage of the second support member but not the first support member while the second display platform has an aperture through which the second support member may not pass.

13 Claims, 5 Drawing Sheets

EDIBLE CAKE STAND KIT

FIELD OF THE INVENTION

The present invention pertains generally to a kit of edible cake stand pieces and methods of manufacturing, methods of assembling and assemblies thereof. More particularly, the present invention relates to a kit of edible cake stand pieces comprised of confectionery.

BACKGROUND OF THE INVENTION

Cake stands (particularly tiered cake stands) are known for their use in displaying cakes, pastries, scones, sandwiches and the like. Cake stands are typically comprised of materials such as porcelain and metal and comprise several joints (such as screw-pair arrangements). They are troublesome and intricate to assemble. Tiered cake stands are generally used in venues such as cafes, hotels, and restaurants as a means of serving afternoon tea or other similar meals and are associated with a 'high-end' service.

There is an increasing demand for delivered or take-away afternoon tea style meals. For example, for consumption at a customer's home or on picnics (i.e. for 'remote consumption'). Said meals may be delivered directly by a local supplier or are posted by a supplier via a logistics network. Customers on these occasions like to have the afternoon tea style consumables displayed on a tiered cake stand. There are several disadvantages to using tiered cake stands in a remote consumption environment. It is unlikely the customer will own their own tiered cake stand and thus one must be provided by the supplier. However, tiered cake stands are very easily broken when in transit, they are heavy and, if pre-assembled, bulky (the latter two factors increasing the cost of postage). They are generally expensive to purchase but are re-useable, therefore a customer is required to post a tiered cake stand back to the supplier once they have consumed their meal (further increasing the risk of breakage and cost of postage). Unlike in a cafe, hotel or restaurant the cake stands will be regularly assembled and disassembled, again increasing the risk of breakage. This risk is significantly increased because each customer is likely to be a novice at assembling and disassembling a provided tiered cake stand. In addition, cafes, restaurants and hotels are subject to strict food safety and hygiene requirements. This is not true of remote consumption environments, when a cake stand is sent to and fro between many of these environments there is an increased risk of poor food safety induced illness.

Some of these shortcomings are sought to be solved by Wilton Brands LLC (see https://www.wilton.com/four-tiered-stacked-dessert-tower/307-856.html) which produces a collapsible four-tier cake stand tower of several interlocked individual plastic pieces, which when in extended form define central member to support four display tiers. However, the stand of Wilton Brands LLC is still relatively bulky and would still need to be returned, if provided by the supplier of the afternoon tea. RU74275U1 describes a kit for a tiered cake stand of at least two tiers which is formed from an edible material such as chocolate, a glaze, marmalade, caramel, jelly, lollipops or combinations thereof. In an embodiment having three tiers, the upper two tiers are each supported by three chocolate rods, using six separate rods. The cake display tiers and the rods may be packaged with a cake for transport and assembly locally.

The present inventor has found a solution to the aforementioned shortcomings in tiered cake stands.

Problem to be Solved by the Invention

It is an object of the invention to provide an improved kit of cake stand pieces which is edible and may be assembled into a functional tiered cake stand. It is a further object of the invention to provide an improved kit of edible cake stand pieces suitable for posting.

SUMMARY OF THE INVENTION

In accordance with a first aspect of the invention, there is provided a kit of edible cake stand pieces comprising a base, at least two cake display platforms and a stem for supporting the cake display platforms, the stem having a base end and an opposing upper end; a first support member for supporting a first display platform; and a second support member for supporting a second display platform which second support member is disposed further from the base end than the first support member, wherein the first support member has a larger radial extent than the second support member and wherein the first display platform has a first aperture formed therein through which the upper end of the stem may pass, which first aperture is sized so that the second support member may pass through it but the first support member may not, while the second display platform has a second aperture sized so that the second support member may not pass through the second aperture, whereby the cake stand pieces are configured such that the first display platform may be supported by the first support member and the second display platform may be supported by the second support member.

In a second aspect of the invention, there is provided a method of making the kit of edible cake stand pieces of the first aspect, the method comprising heating a material until it becomes fluid or mixing two or more pre-materials to form a fluid, inputting the fluid into a mold or molds, allowing the fluid to set, removing the set casting(s) from the mold(s), and optionally separating the casting(s) into individual kit pieces and/or removing excess material.

In a third aspect of the invention, there is provided a method of assembling the kit of edible cake stand pieces of the first aspect into a tiered cake stand, the method comprising feeding the upper end of the stem through the first aperture of the first display platform and subsequently feeding the upper end of the stem through the second aperture of the second display platform, moving the first display platform towards the base end of stem until it comes to rest on the first support member, and moving the second display platform towards the base end of the stem until it comes to rest on the second support member.

In a fourth aspect of the invention, there is provided an assembled cake stand assembled using the kit of edible cake stand pieces of the first aspect.

Advantages of the Invention

The kit of edible cake stand pieces and methods of manufacture and other aspects of the invention provide a cost-efficient, transportable, robust, simple to assemble, and hygienic assembled tiered cake stand.

DETAILED DESCRIPTION OF THE INVENTION

The invention concerns a kit of edible cake stand pieces comprising a base, at least two cake display platforms and a stem for supporting the cake display platforms. The stem having a base end and an opposing upper end; a first support member for supporting a first display platform; and a second support member for supporting a second display platform which second support member is disposed further from the base end than the first support member. The first support member has a larger radial extent than the second support member and the first display platform has a first aperture formed therein through which the upper end of the stem may pass. The first aperture is sized so that the second support member may pass through it but the first support member may not, while the second display platform has a second aperture sized so that the second support member may not pass through the second aperture. The upper end of the stem may preferably pass through the second aperture. The cake stand pieces are configured such that the first display platform may be supported by the first support member and the second display platform may be supported by the second support member.

An advantage of the kit being edible is that once any afternoon tea style food (displayed on a tiered cake stand assembled from the kit) is consumed, the tiered cake stand may also be consumed. Where a tiered cake stand assembled from the kit is used in traditional venues (such as cafés, hotels and restaurants) staffing and utility costs are reduced because it does not need to be cleaned. Where a tiered cake stand assembled from the kit is used for remote consumption of afternoon tea style meals (e.g. afternoon tea is delivered to a customer's home) it is not repetitively re-used at new remote venues (which typically have lower food safety standards than traditional venues). This provides improved food safety and hygiene because the tiered cake stand is used only once. The weight of the kit is generally reduced by comparison to typical cake stands (comprised of porcelain, metal or similar materials). In addition, if the kit of edible cake stand pieces is posted through a logistics network, it is only posted once (it is not returned to the supplier). These latter two factors reduce the overall cost of postage when afternoon tea is consumed at a remote venue.

A further advantage of the kit of edible cake stand pieces is that it is easy to assemble into a tiered cake stand and said assembly does not require tools. The pieces of the kit do not comprise complex joints such as screw-pair arrangements, nor do they require permanent fixing such as by using nuts and bolts. This is particularly advantageous as the kit is comprised of edible pieces. Typical materials (such as porcelain and metal) used to manufacture tiered cake stands are generally harder than edible materials. Using the example of a screw pair arrangement, it is difficult to machine grooves and threads into edible materials. Similarly, grooves and threads comprised of edible material are more likely to break during assembly of the pieces compromising the integrity of an assembled cake stand.

The kit of edible cake stand pieces may optionally comprise at least three cake display platforms. Preferably, the number of support members disposed on the stem is equal to the number of cake display platforms.

For example, the kit of edible cake stand pieces may comprise a base, at least three cake display platforms and a stem for supporting the cake display platforms. The stem having a base end and an opposing upper end; a first support member for supporting a first cake display platform; a second support member for supporting a second cake display platform; and a third support member for supporting a third cake display platform. The second support member is disposed further away from the base end than the first support member and the third support member is disposed further away from the base end than the second support member. The first support member has a larger radial extent than the second support member and the second support member has a larger radial extent than the third support member. The first display platform has a first aperture formed therein, the second display platform has a second aperture formed therein, and the third display platform has a third aperture formed therein. The upper end of the stem may pass through the first and second apertures and preferably may pass through the third aperture. The first aperture is sized so that the second and third support members may pass through it but the first support member may not. The second aperture is sized so that the third support member may pass through it but the first and second support members may not. The third aperture is sized so that none of the support members may pass through it. The cake stand pieces are configured such that the first display platform may be supported by the first support member, the second display platform may be supported by the second support member, and the third display platform may be supported by the third support member.

The kit of edible cake stand pieces may optionally comprise at least four cake display platforms (e.g. five, six or more cake display platforms). In this case, the kit of edible cake stand pieces may be configured to expand the general arrangement described above (for the kit of edible cake stand pieces comprising at least two and at least three cake display platforms).

In all embodiments the kit of edible cake stand pieces comprise confectionery. The kit of edible cake stand pieces preferably consists essentially of, more preferably consists of confectionary. More particularly, at least the stem is made of confectionery and preferably also at least one and preferably all the cake display platforms are made of confectionery and most preferably all the essential pieces of the edible cake stand kit are made of confectionery. The kit preferably comprises at least one type of confectionery but may optionally comprised of two or more types of confectionery. Preferably, the kit comprises solely one type of confectionery. For example, the confectionery may be one or more of or any combination of chocolate, icing, fudge, toffee, tablet, hard candy (e.g. hard-boiled sweets), liquorice, marzipan, honeycomb and compressed edible powder. The pieces of the kit may each independently be made of the same or different types of confectionery. Preferably, the confectionery is chocolate. The kit of edible cake stand pieces preferably comprises and is preferably comprised of chocolate. The chocolate may be any type of chocolate, such as one or more of or any combination of milk, dark, white and ruby chocolate. Most preferably, the kit is comprised of tempered chocolate (e.g. chocolate comprising cocoa butter crystals present primarily in the β(V) polymorph).

An advantage of the kit being comprised of confectionery is that the edible material compliments a typical afternoon tea style meal. This feature provides for a unique and desirable assembled tiered cake stand. The kit of edible cake stand pieces is configured to facilitate safe transport of unassembled pieces (such as through a postal network) and subsequent easy assembly. It is difficult to achieve these benefits with known cake stand configurations if they were to be comprised of confectionery.

Preferably, the stem of the kit of edible cake stand pieces is elongate. Preferably, the stem is a straight stem. (e.g. the stem is parallel with and intersected by an axis defined by the base end and the upper end of the stem). Preferably, the stem has a length of from 5 to 100 cm, more preferably from 10 to 80 cm, still more preferably from 15 to 60 cm, most preferably from 20 to 50 cm.

A cross section of the stem may be any shape and optionally the shape may change along the length of the stem. Preferably, the shape is constant along the length of the stem. Preferably, the cross section of the stem has a square, triangular or ellipse shape, more preferably an ellipse shape, most preferably a circular shape. Preferably, the size of the cross section is constant along the length of the stem (for example, the stem may have a cylindrical or cuboid shape). Preferably, the stem has a maximum width of up to 6 cm, more preferably up to 5 cm, still more preferably up to 4 cm, most preferably up to 3 cm, for example up to 2 cm. Preferably, the stem has a width of at least 0.25 cm, preferably at least 0.5 cm and optionally at least 0.75 cm. Optionally, the size of the cross section of the stem is inconsistent along its length. In this option, the size of the cross section preferably decreases from the base end towards the upper end of the stem (for example, the stem may have a conical or pyramidal shape). Still in this option, a maximum width of the stem is preferably up to 12 cm, more preferably up to 10 cm, most preferably up to 8 cm, for example up to 6 cm. Where the stem has a circular cross section the width of the stem is equal to the diameter of the stem.

Preferably, the stem is a single integral stem. For example, the stem may be a single molded piece and/or the stem is absent joints or fixings. Provision of a single integral stem in the kit of edible cake stand pieces affords several advantages. It is typical that a tiered cake stand will have a stem comprising several individual stem pieces that are assembled using corresponding male and female screw-pair elements disposed at their ends. A single integral edible stem provides the advantages of decreased risk of breakage during transit and assembly, improved strength of the stem (and thus improved strength of an assembled tiered cake stand), and improved ease of manufacture and assembly.

Preferably, the base of the kit of edible cake stand pieces is configured to receive the stem (preferably having the cake display platforms assembled thereon) and support it in an upright orientation when the base sits on a supporting surface.

Preferably, the base is configured to receive at least portion of the stem, which portion is disposed between the base end (preferably inclusive of the base end) and the first support member (optionally inclusive of the first support member) of the stem. In one option, the base is configured to receive the first support member of the stem. More preferably, the base is configured to receive the base end of the stem. Optionally, the base is configured to receive or engage with the stem by a combination of the above.

Preferably, the base comprises a hole (e.g. slot or aperture) or recess formed therein and configured for receiving the portion of the stem. More preferably, the hole or recess is configured for receiving the base end of the stem.

Preferably, the base is configured to support the stem in an upright orientation on a flat supporting surface having a slope angle (relative a level surface) of from −25 to +25°, more preferably from −20 to +20°, still more preferably from −15 to +15°, most preferably from −10 to +10°, for example from −5 to +5°, e.g. from −2 to +2°. In one option, the flat supporting surface is a level surface.

The base preferably comprises a single contact surface configured for contacting the supporting surface. Optionally, the base comprises at least two (for example, three or four) contact surfaces configured for contacting the supporting surface. In this option, the base may comprise at least three legs each comprising a contact surface. Preferably, the contact surface(s) is flat such that it sits flush on the supporting surface and/or is perpendicular to the stem. In one option, the contact surface(s) is perpendicular to an axis defined by the base end of the stem and a center of gravity of the stem (preferably, the center of gravity of the stem is determined with the cake display platforms assembled thereon).

Preferably, the contact surface(s) has a square, triangular or elliptical shape, more preferably an elliptical shape, most preferably a circular shape. Preferably, the contact surface(s) has a width of at least 2 times the maximum width of the stem and preferably up to 20 times the maximum width of the stem, more preferably up to 10 times the maximum with of the stem. More preferably, it is in the range of from 2.5 or more preferably 3 to 6 times the maximum width of the stem. Preferably, the ratio of the width of the contact surface to the height of the stem is in the range from 1:80 to 1:2.

Preferably, the base is integral with the stem, more preferably the base is integral with the base end of the stem. This provides the advantage of a simplified kit which is easier to assemble and manufacture due to a reduction in the number of kit pieces. The stem is preferably configured to be self-standing when the base end rests on the supporting surface (e.g. a level surface) (prior to, during and/or after assembly of the kit of cake stand pieces). This feature further simplifies assembly of the kit of cake stand pieces. A person assembling the kit is not required to simultaneously hold the stem and a display platform as the stem is self-standing in an orientation that facilitates assembly.

The support members of the stem may have any shape. Preferably, the support members protrude from the stem. More preferably, the support members protrude from the stem in a lateral (e.g. radial) direction. (For example, the support members are flanges). Optionally, the support members are formed on and/or in a surface of the stem. For example, the support members may be ridges each disposed in and at a different point along the length a stem (e.g. a pyramidal or cone shaped stem). Preferably, the support members have a depth (along the length of the stem) of up to 4 cm, more preferably up to 3 cm, still more preferably up to 2 cm, for example around 1 cm.

Preferably, the support members extend in a direction perpendicular to the axis defined by the base end and the center of gravity of the stem (optionally having the cake display platforms assembled thereon). e.g. if the stem is straight along its length, the support members preferably extend in a direction perpendicular to the stem.

Preferably, the support members are disposed continuously around a girth of the stem (each at a different point along the length of the stem). e.g. the support members are disposed continuously around the circumference of the stem where the stem has a circular cross-section. Optionally, a support member may comprise at least two (for example, three or four) support elements disposed at the same point along the length of the stem but each at a different place around the girth of the stem. In this option, the support elements are preferably disposed equidistantly around the girth of the stem.

Preferably, the first support member is disposed at the base end of the stem. More preferably, the first support member is also the base.

Preferably, the first support member is disposed at the base end of the stem and there is not a support member disposed at the upper end of the stem. A spacing is defined along the stem between each pair of adjacent support members and between a top support member and the upper end of the stem. Preferably, n support members are each disposed at a point along the length of the stem such that there are n equal spacings.

Preferably, the support members are circular. (e.g. the support members have a circular radial extent). A circular support member provides the advantage that, when the kit of edible cake stand pieces is assembled, regardless of where a weight (or pressure) is applied around a cake display platform that weight is equally supported. This is particularly useful during use of a tiered cake stand assembled from the kit as confectionary is regularly placed onto and removed from display platforms.

Preferably, the stem further comprises a stabilising member (e.g. a stabilising rim) disposed above the first support member, wherein the stabilising member has a radial extent corresponding to the size of the first aperture such that an edge of the stabilising member abuts an inner surface of the first aperture. The stabilising member provides the advantage of minimizing movement (e.g. teetering) of the first cake display platform relative the stem.

Preferably, the stabilising member is disposed continuously around the girth of the stem. e.g. where the stem has a circular cross section, the stabilising member is preferably disposed around the full circumference of the stem. Optionally, the stabilising member may be comprised of at least two (for example, three or four) stabilising sub-parts disposed at the same point along the length of the stem but each at a different place around the girth of the stem. In this option, the stabilising sub-parts are preferably disposed equidistantly around the girth of the stem. Preferably the stabilising member is integral with the stem.

Where the kit of edible cake stand pieces comprises more than two cake display platforms (and, therefore, preferably more than two support members) the stem preferably comprises a stabilising member (e.g. a stabilising rim) above each support member excluding a top (relative the upper end of the stem) support member. Each stabilising member preferably has a radial extent corresponding to the size of the aperture of its corresponding cake display platform.

Preferably, each stabilising member has a depth equal to the depth of the aperture of its corresponding cake display platform. More preferably, the whole inner surface of an aperture (of a cake display platform) abuts an edge surface of its corresponding stabilising member.

Preferably, each stabilising member is disposed directly above (along and relative the upper end of the stem) its corresponding support member. Preferably, each stabilising member has a radial extent equal to the radial extent of the support member disposed directly above it (relative an upper end of the stem). Preferably, each stabilising member has the same shape as the aperture of its corresponding cake display platform.

The stabilising member is configured to minimise (and preferably inhibit) movement of the first cake display platform (or cake display platforms) away from a level orientation when the kit of edible cake stand pieces is assembled and in use, e.g. to minimise and preferably inhibit teetering of the cake display platform. Preferably, the cake display platforms of the kit may be any shape. For example, the cake display platforms may be a quadrilateral, ellipse and/or triangular.

Preferably, all cake display platforms in the kit of edible cake stand pieces have the same shape. Preferably, the cake display platforms are ellipse shaped, more preferably the cake display platforms are circular.

Preferably, the cake display platforms have a maximum depth of up to 4 cm, more preferably up to 3 cm, still more preferably up to 2 cm, for example around 1 cm.

Optionally, the ratio of depth to radial extent for each cake display platform may be the same. Preferably, the cake display platforms are generally planar (e.g. they are plates). The cake display platforms are preferably configured to display confectionary such as cake, scones and the like.

Optionally, the cake display platforms have an equal maximum radial extent. Preferably, the first cake display platform (which is configured to be supported nearer the base end of the stem than the second cake display platform) has a larger maximum radial extent than the second cake display platform. Where the kit of edible cake stand pieces comprises more than two cake display platforms, each cake display platform has a smaller maximum radial extent than the cake display platform configured to be supported beneath it on the stem (relative the base end of the stem). This feature lowers the center of gravity of a tiered cake stand assembled from the kit of edible cake stand pieces and thus improves its stability.

Preferably, the maximum radial extent of the first cake display platform (i.e. the cake display platform configured to be supported nearest the base end of the stem) is up to 90 cm, more preferably up to 80 cm, still more preferably up to 70 cm, most preferably up to 60 cm, for example from 10 to 50 cm, e.g. around 20 cm.

Preferably, the first aperture is disposed medially (e.g. centrally) in the first display platform and the second aperture is disposed medially (e.g. centrally) in the second display platform (i.e. each cake display platform preferably has a medially disposed aperture). This feature improves the stability of a tiered cake stand assembled from a kit of edible cake stand pieces comprising a straight stem.

Preferably, the apertures have (e.g. the perimeter of the apertures are) the same shape as their corresponding support member. Preferably, the apertures are ellipse shaped, more preferably the apertures are circular.

Preferably, at least one (more preferably, all) display platform(s) further comprise a stabilising element disposed on and/or in a surface and around an aperture of that display platform, wherein an inside face of the stabilising element is configured to abut an edge of a corresponding support member. Preferably, the inside face of the stabilising element circumscribes the aperture at a distance away from the aperture (such that it may abut an edge of the corresponding support member). Preferably, the entirety of the inside face is configured to abut the edge of a corresponding support member (e.g. the entirety of the inside face is configured to be flush with the edge). The surface of a cake display platform comprising the stabilising element may be referred to as a bottom surface.

The stabilising element may for example be a recess disposed in the surface and around the perimeter of the aperture of the display platform, wherein the recess is configured for receiving a corresponding support member. In this example, the depth of the recess is preferably equal to the depth of the corresponding support member. Where the first cake display platform comprises a recess stabilising element (which recess has the same depth as the first support member) and where the first support member is also the base, the bottom surface of the first cake display platform extends the contact surface. The extended contact surface improves the stability of a tiered cake stand assembled from the kit of edible cake stand pieces. Preferably, the stabilising element is a stabilising lip which protrudes from the bottom surface of the display platform. Preferably, the stabilising lip protrudes from the surface for a distance equal to the depth of its corresponding support member.

Preferably, the inside face of the stabilising element is configured to abut the corresponding support member continuously around that support member's edge. Optionally, a stabilising element may be comprised of at least 2 (for example, 3 or 4) stabilising components disposed at intervals around an aperture. In this option, the stabilising components are preferably disposed at equidistant intervals around the aperture (and thus have separate inside faces abutting the edge of the support member at equidistant intervals).

The stabilising element is configured to further minimise (and preferably inhibit) movement of a cake display platform away from a level orientation when the kit of edible cake stand pieces is assembled and in use (e.g. to minimise and preferably inhibit teetering of the cake display platform).

Optionally, a surface or areas of the surface of a piece or pieces of the kit may be suitable for superficial melting (e.g. melting with a lit match). For example, the edge or a top surface of support members, the edge of stabilising members, the inner surface of the apertures, and/or the inner face of stabilising element(s) may be suitable for superficial melting. Where the kit of edible cake stand pieces is comprised of chocolate any surface of any piece of the kit is suitable for superficial melting. Surface areas of a piece that abut a surface area of another piece ('contact areas') when the kit is assembled may be superficially melted immediately before assembly take place. Thus, once the melted area(s) re-solidify the pieces are permanently fixed together in assembled form. A tiered cake stand assembled from the kit therefore has improved stability. In particular, the assembled pieces are less likely to move relative to each other.

Optionally, the kit of edible cake stand pieces further comprises a handle. Preferably, the handle comprises an aperture or slot configured to receive an upper end of the stem. Preferably, the handle is a decorative element for improving the aesthetic appearance of a tiered cake stand assembled from the kit. A surface of the upper end of the stem and/or an inside surface of the aperture or slot of the handle may be additional 'contact areas' suitable for superficial melting. In one example, the handle may be used, once assemble with the upper end of the stem, to carry the assembled tiered cake stand (optionally including the weight of a load of confectionary on the cake display platforms).

Optionally, the kit of edible cake stand pieces is configured to be suitable for posting via a logistics network and/or through a postbox. An advantage of this feature is that the kit of edible cake stand pieces can be delivered to a customer without requiring that they are present at the time of delivery.

In a preferred embodiment, the invention concerns a kit of edible cake stand pieces comprised of confectionery (preferably, comprised of chocolate). The kit, according to this embodiment, comprises at least two cake display platforms and a single integral stem for supporting the cake display platforms. The stem, in this embodiment, has a base end and an opposing upper end; a first (preferably circular) support member for supporting a first display platform; and a second (preferably circular) support member for supporting a second display platform which second support member is disposed further from the base end than the first support member and the stem further comprises an integral base at its base end. The first support member, according to this embodiment, has a larger radial extent than the second support member and the first display platform has a first aperture formed therein through which the upper end of the stem may pass. The first aperture is sized so that the second support member may pass through it but the first support member may not, while the second display platform has a second aperture sized so that the second support member may not pass through the second aperture. The upper end of the stem may preferably pass through the second aperture. The cake stand pieces are configured such that the first display platform may be supported by the first support member and the second display platform may be supported by the second support member. Preferably, the stem is configured to be self-standing when the base end rests on a level surface. Preferably, the stem is straight. Preferably, the stem further comprises a stabilising member disposed above the first support member, wherein the stabilising member has a radial extent corresponding to the size of the first aperture such that an edge of the stabilising member abuts an inner surface of the first aperture.

The second aspect of the invention concerns a method of making the kit of edible cake stand pieces of the first aspect, the method comprising heating a material until it becomes fluid or mixing two or more pre-materials to form a fluid, inputting the fluid into a mold or molds, allowing the fluid to set, removing the set casting(s) from the mold(s), and optionally separating the casting(s) into individual kit pieces and/or removing excess material (for example, gates and risers). Preferably, the fluid is chocolate, more preferably tempered chocolate (e.g. melted tempered chocolate). The method of making the kit of edible cake stand pieces may optionally include subsequently packaging the pieces into an envelope or parcel. The third aspect of the invention concerns a method of assembling the kit of edible cake stand pieces of the first aspect into a tiered cake stand, the method comprising feeding the upper end of the stem through the first aperture of the first display platform and subsequently feeding the upper end of the stem through the second aperture of the second display platform, moving the first display platform towards the base end of stem until it comes to rest on the first support member, and moving the second display platform towards the base end of the stem until it comes to rest on the second support member. Optionally, the first display platform may be moved towards the base end of the stem until it comes to rest on the first support member before feeding the upper end of the stem through the second aperture of the second display platform. Optionally (where the stem does not comprise an integral base) the first step of the method of assembling the kit of edible cake stand pieces comprises feeding the base end of the stem into the slot of the base. Optionally, one or more contact areas of a piece or pieces of the kit are superficially melted (for example, by using a lit match) immediately before assembling the pieces.

The fourth aspect of the invention concerns an assembled cake stand assembled using the kit of edible cake stand pieces of the first aspect. Preferably, the kit of edible cake stand pieces is made using the method of the second aspect. Preferably, the assembled cake stand is assembled using the method of third aspect. Preferably, the assembled cake stand consists essentially of chocolate.

The invention will now be described in more detail, without limitation, with reference to the accompanying Figures.

Figure 1:
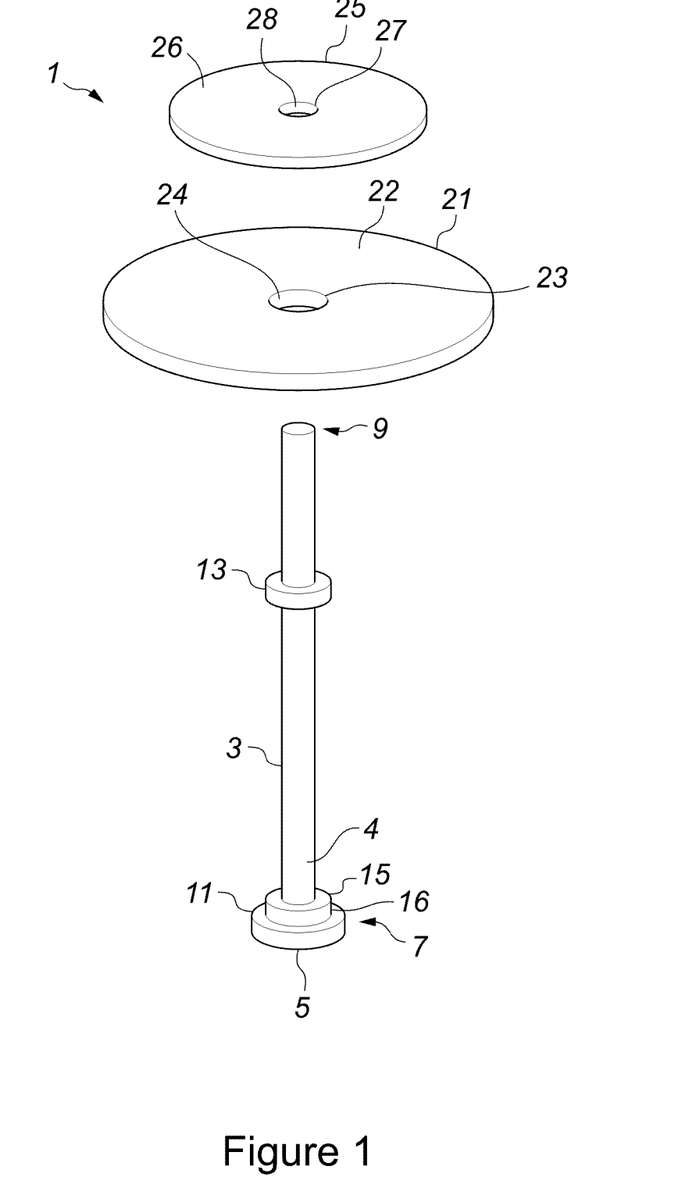
FIG. 1 is a perspective view of a kit of edible cake stand pieces comprising two cake display platforms.

FIG. 1 is a perspective view of a kit of edible cake stand pieces (1) comprising an elongate (rod like) single integral stem (3) having an integral base (5). The stem (3) has a base end (7), an opposing upper end (9), and a diameter of 10 mm. The stem (3) is configured such that it may self-stand (in an upright position) when the base (5) sits on a flat surface (not shown). The stem (3) has a first support flange (11) and a second support flange (13) having a smaller radial extent than the first support flange (11). On the stem (3), disposed directly above the first support flange (11), is a first stabilising rim (15) having a similar radial extent to the second support flange (13).

The kit of edible cake stand pieces (1) has a first circular display tier (21) and a second circular display tier (25). The first display tier (21) has a larger diameter to that of the second display tier (25) while they both have a similar depth of around 5 mm.

The first display tier (21) has a first aperture (23) having a size larger than the radial extent of the second support flange (13) but smaller than the radial extent of the first support flange (11). Thus, during assembly, the upper end (9) of the stem (3) can travel through the first aperture (23). The first display tier (21) continues down the stem (3), passing over the second support flange (13), and comes to rest on the first support flange (11). Due to the size of the first aperture (23) there is a space between an inner surface (24) of the first aperture (23) and a surface (4) of the stem (3). Therefore, the first stabilising rim (15) is provided such that when the first display tier (21) rests on the first support flange (11) the inner surface (24) of the first aperture (23) abuts an outer edge (16) of the stabilising rim (15) to reduce or prohibit movement of the first display tier (21) relative a plane perpendicular to the stem (3) and thus inhibit teetering of the first display tier (21), which may otherwise occur when the first display tier (21) is carrying a load (e.g. a load of confectionary) that is distributed unevenly across an upper surface (22) of the first display tier (21). The second circular display tier (25) has an upper surface (26) and a second aperture (27) having an inner surface (28). The second aperture (27) has a radial extent smaller than the radial extent of the second support flange (13) and the first support flange (11). Thus, during assembly, the upper end (9) of the stem (3) can travel through the second aperture (27). The second display tier (25) continues down the stem (3) and comes to rest on the second support flange (13). An inner surface (28) of the second aperture (27) abuts the surface (4) of the stem (3).

The support flanges (11 and 13) and apertures (23 and 27) are sized such that: i) when assembling the kit of edible cake stand pieces (1) the upper end (9) of the stem (3) must pass through the first aperture (23) before passing through the second aperture (27); and ii) the apertures (23 and 27) must receive the upper end (9), not the base end (7), of the stem (3) during assembly.

Figure 2:
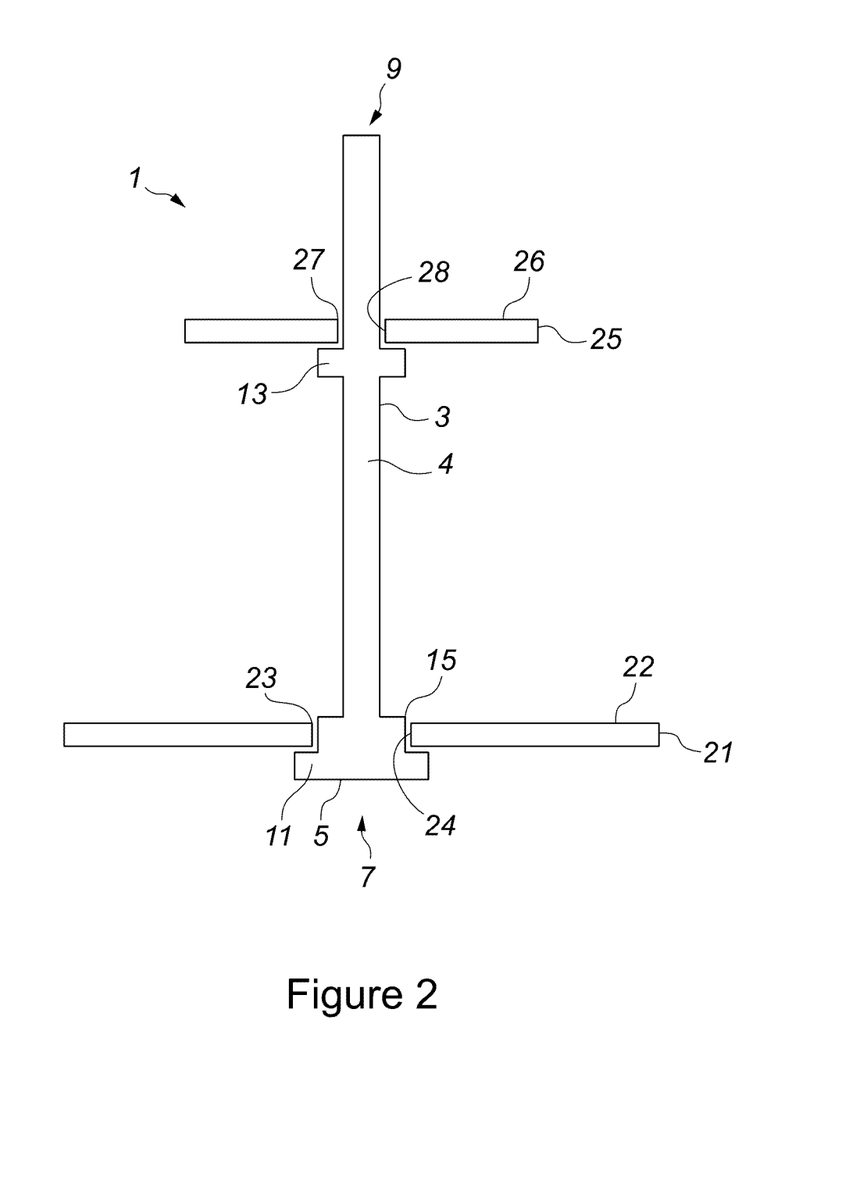
FIG. 2 is a cross-sectional view of the kit of edible cake stand pieces of FIG. 1 in assembled form.

FIG. 2 is a cross-sectional view of the kit of edible cake stand pieces (1) of FIG. 1 in assembled form. The plane of the cross-section intersects a longitudinal axis central to the stem (3). The first display tier (21) is resting on the first support flange (11) and is stabilised by the first stabilising rim (15) of the stem (3). The second display tier (25) is resting on the second support flange (13). The support flanges (11 and 13) are configured to support the weight of their respective display tier (21 or 25) inclusive of a weight of displayed confectionary.

The assembled cake stand and kit (1) of FIGS. 1 and 2 is typically made entirely of chocolate.

Figure 3:
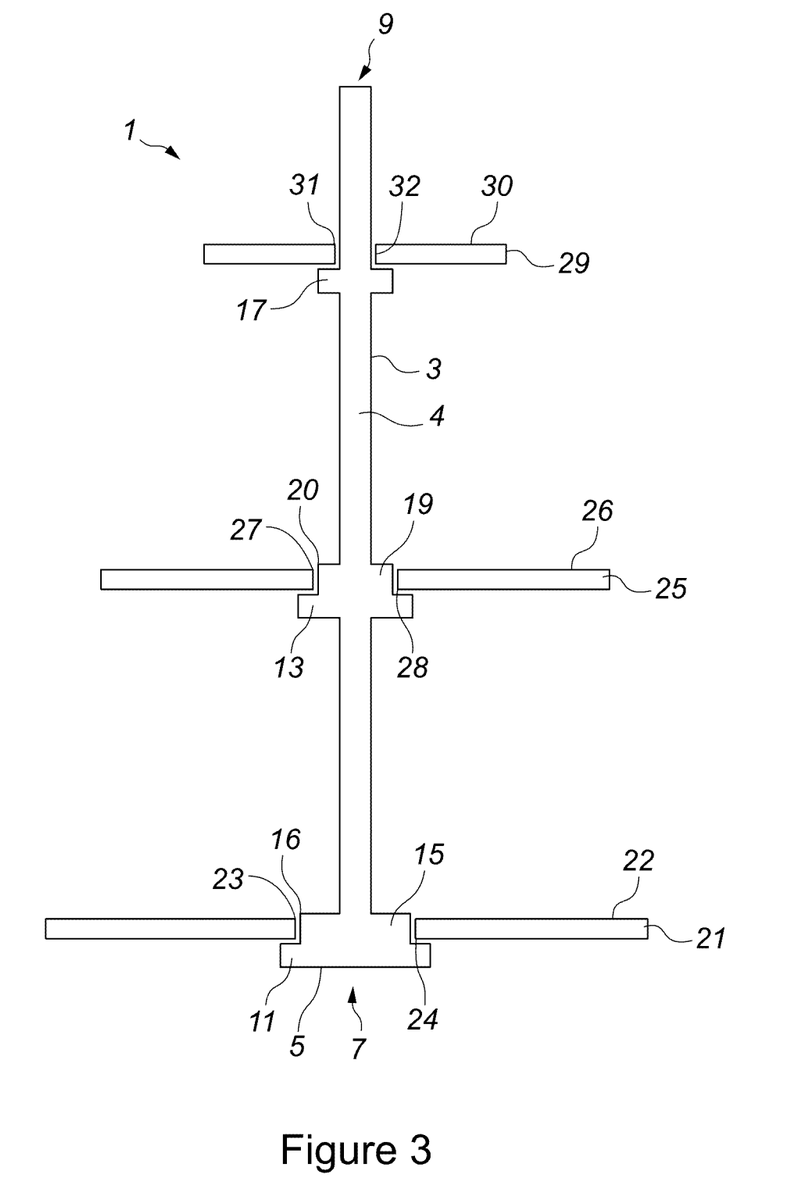
FIG. 3 is a cross-sectional view of a kit of edible cake stand pieces in assembled form and comprising three cake display platforms.

FIG. 3 is a cross-sectional view of an assembled kit of edible cake stand pieces (1) having three display tiers. The kit of edible cake stand pieces (1) includes an elongate (rod like) single integral stem (3) having a base (5) and a diameter of approximately 12 mm. The plane of the cross-section intersects a longitudinal axis central to the stem (3). The stem (3) has a base end (7), an opposing upper end (9), a first support flange (11), a second support flange (13), and a third support flange (17). The stem (3) is configured such that it may self-stand (in an upright position) when the base (5) sits on a flat level surface (not shown). The second support flange (13) has a smaller radial extent that the first support flange (11) and the third support flange (17) has a smaller radial extent than the second support flange (13). On the stem (3), disposed directly above the first support flange (11), is a first stabilising rim (15) having a similar radial extent to the second support flange (13). Similarly, disposed directly above the second support flange (13) is a second stabilising rim (19) having a similar radial extent to the third support flange (17).

The kit of edible cake stand pieces (1) has a first display tier (21) having a first aperture (23), a second display tier (25) having a second aperture (27), and a third display tier (29) having a third aperture (31). Each of the display tiers (21, 25, and 29) have a similar depth of approximately 6 mm. The first aperture (23) has a larger size than the radial extent of both the second and third support flanges (13 and 17) but a smaller size than the radial extent of the first support flange (11). Thus, during assembly, the upper end (9) of the stem (3) can travel through the first aperture (23). The first display tier (21) continues down the stem (3), passing over both the third and second support flanges (17 and 13) before coming to rest on the first support flange (11). The second aperture (27) has a size larger than the radial extent of the third support flange (17) but smaller than the radial extent of the first and second support flanges (11 and 13). Thus, during assembly, the upper end (9) of the stem (3) can travel though the second aperture (27). The second display tier (25) continues down the stem, passing over the third support flange (17), and comes to rest on the second support flange (13). The third aperture (31) has a smaller size than the radial extent of all the support flanges (11, 13 and 17). Thus, during assembly, the upper end (9) of the stem (3) can travel through the third aperture (31). The third display tier (29) continues down the stem (3) before coming to rest on the third support flange (31).

Due to the size of the first aperture (23) there is a space between an inner surface (24) of the first aperture (23) and a surface (4) of the stem (3). Therefore, the first stabilising rim (15) is provided such that when the first display tier (21) rests on the first support flange (11) the inner surface (24) of the first aperture (23) abuts an edge (16) of the first stabilising rim (15) to reduce or prohibit movement of the first display tier (21) relative a plane perpendicular to the stem (3) (e.g. to reduce teetering). Similarly, due to the size of the second aperture (27) there is a space between an inner surface (28) of the second aperture (27) and the surface (4) of the stem (3). Therefore, the second stabilising rim (19) is provided such that when the second display tier (25) rests on the second support flange (13) an inner surface (28) of the second aperture (27) abuts an edge (20) of the second stabilising rim (19). An inner surface (32) of the third aperture (31) abuts the surface (4) of the stem (3) and therefore a third stabilising rim is not required.

Figure 4A:
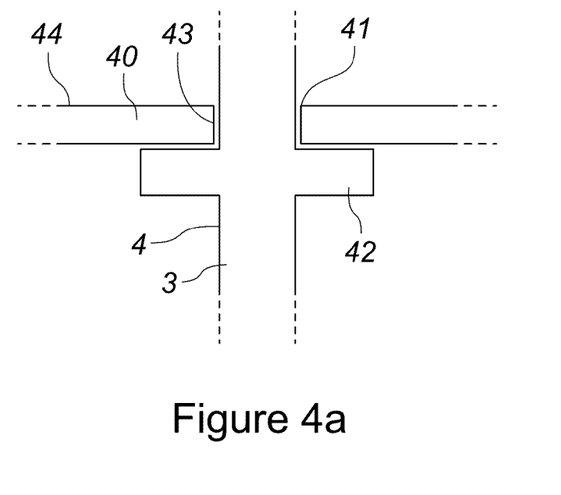
FIGS. 4A to 4C are cross-sectional views of engagements between a cake display platform and a support member.
Figure 4B:
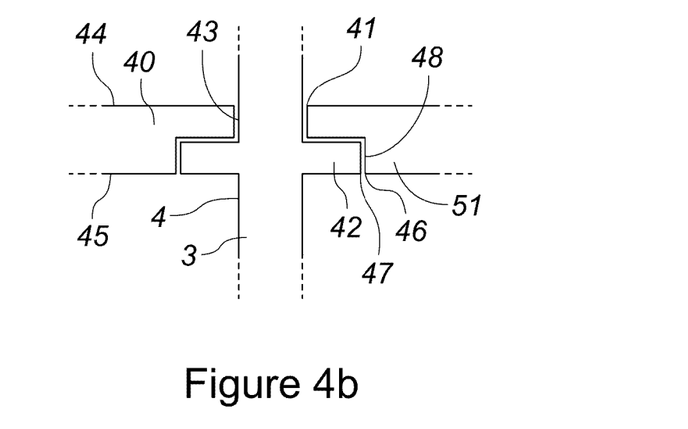
Figure 4C:
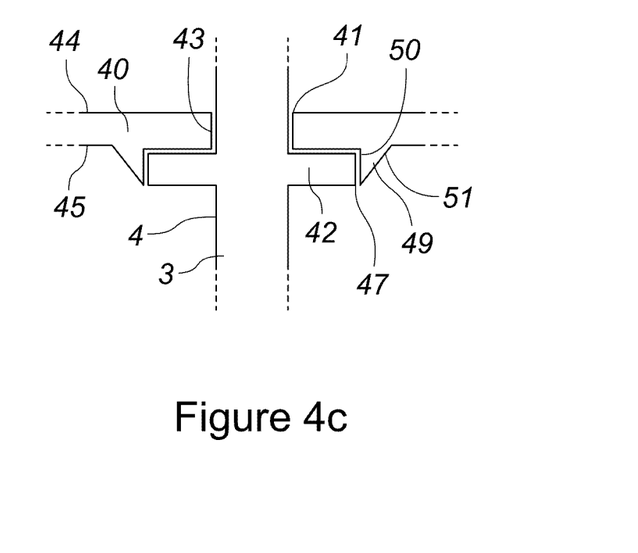

FIGS. 4A to 4C each illustrate a cross-section of a contact between a display tier (40) and a support flange (42) of a stem (3). The cross-section intersects a longitudinal axis central to the stem (3). The display tier (40) is resting on the support flange (42) while the stem (3) is accommodated within an aperture (41) of the display tier (40). Thus, the display tier (40) cannot be separated from the stem (3) other than by travelling up the stem (3). The stem (3) has an outer surface (4) abutting an inner surface (43) of the aperture (41) around its girth. Therefore, a plane defined by an upper surface (44) of the display tier (40) is restricted from moving [e.g. teetering] from an orientation which is not perpendicular to a longitudinal axis of the stem (3).

The display tiers (40) of FIGS. 4B and 4C further comprise a stabilising element (51).

In FIG. 4B, the display tier (40) has a depth double that of the display tier illustrated in FIG. 4A [and double that of a depth of the support flange (42)]. The display tier (40) has within a bottom surface (45) about the aperture (41) a recess (46). The recess (46) is configured to correspond in shape and size to the support flange (42). Thus, an inside face (48) of the recess (46) abuts an edge (47) of the support flange (42). Therefore, the display tier (40) is further restricted from moving (e.g. teetering) from an orientation which is not perpendicular to a longitudinal axis of the stem (3).

In FIG. 4C, the display tier (40) has a depth similar to that of the display tier illustrated in FIG. 4A. The display tier (40) has on a bottom surface (45) and about the aperture (41) a support lip (49) projecting downwardly for a distance similar to the depth of the display tier (40). An inside face (50) of the support lip (49) abuts an edge (47) of the support flange (42). Therefore, the display tier (40) is further restricted from moving (e.g. teetering) from an orientation which is not perpendicular to a longitudinal axis of the stem (3).

The invention has been described with reference to preferred embodiments. However, it will be appreciated that variations and modifications can be effected by a person of ordinary skill in the art without departing from the scope of the invention.

The invention claimed is:

1. A kit of edible cake stand pieces comprising
a base, at least two cake display platforms and a stem for supporting the cake display platforms,
the stem having a base end and an opposing upper end; a first support member for supporting a first display platform; and a second support member for supporting a second display platform which second support member is disposed further from the base end than the first support member,
wherein the first support member has a larger radial extent than the second support member and
wherein the first display platform has a first aperture formed therein through which the upper end of the stem may pass, which first aperture is sized so that the second support member may pass through it but the first support member may not, while the second display platform has a second aperture sized so that the second support member may not pass through the second aperture,
whereby the cake stand pieces are configured such that the first display platform may be supported by the first support member and the second display platform may be supported by the second support member,
wherein the kit is made from confectionery.

2. The kit of edible cake stand pieces as claimed in claim 1, wherein the kit is made from one or more of chocolate, icing, fudge, toffee and tablet.

3. The kit of edible cake stand pieces as claimed in claim 2, wherein the kit is made from chocolate.

4. The kit of edible cake stand pieces as claimed in claim 1, wherein the stem is a single integral stem.

5. The kit of edible cake stand pieces as claimed in claim 1, wherein the base is integral with the stem.

6. The kit of edible cake stand pieces as claimed in claim 1, wherein the stem is configured to be self-standing when the base end rests on a level surface.

7. The kit of edible cake stand pieces as claimed in claim 1, wherein the support members are circular.

8. The kit of edible cake stand pieces as claimed in claim 1, wherein the first aperture is disposed medially in the first display platform and the second aperture is disposed medially in the second display platform.

9. The kit of edible cake stand pieces as claimed in claim 1, wherein the stem further comprises a stabilising member disposed above the first support member, wherein the stabilising member has a radial extent corresponding to the size of the first aperture such that an edge of the stabilising member abuts an inner surface of the first aperture.

10. The kit of edible cake stand pieces as claimed in claim 1, wherein at least one display platform further comprises a stabilising element disposed on and/or in a surface and around an aperture of that display platform, and wherein an inside face of the stabilising element is configured to abut an edge of a corresponding support member.

11. The kit of edible cake stand pieces as claimed in claim 10, wherein the stabilising element is a stabilising lip which protrudes from the surface of the display platform.

12. A method of assembling the kit of edible cake stand pieces of claim 1 into a tiered cake stand, the method comprising
feeding the upper end of the stem through the first aperture of the first display platform and subsequently feeding the upper end of the stem through the second aperture of the second display platform,
moving the first display platform towards the base end of stem until it comes to rest on the first support member, and
moving the second display platform towards the base end of the stem until it comes to rest on the second support member.

13. An assembled cake stand assembled using the kit of edible cake stand pieces of claim 1.

* * * * *